United States Patent
Kwon et al.

(10) Patent No.: US 7,933,629 B2
(45) Date of Patent: Apr. 26, 2011

(54) LOW-COMPLEXITY JOINT TRANSMIT/RECEIVE ANTENNA SELECTION METHOD FOR MIMO SYSTEMS

(75) Inventors: Dong-Seung Kwon, Daejeon (KR); Chung-Gu Kang, Seoul (KR); Jun-Ho Son, Gwangmyeong-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 675 days.

(21) Appl. No.: 12/064,184

(22) PCT Filed: Dec. 21, 2005

(86) PCT No.: PCT/KR2005/004430
§ 371 (c)(1),
(2), (4) Date: Feb. 19, 2008

(87) PCT Pub. No.: WO2007/021058
PCT Pub. Date: Feb. 22, 2007

(65) Prior Publication Data
US 2008/0227498 A1    Sep. 18, 2008

(30) Foreign Application Priority Data

Aug. 19, 2005  (KR) .................. 10-2005-0076502
Dec. 9, 2005   (KR) .................. 10-2005-0120697

(51) Int. Cl.
H04M 1/00       (2006.01)

(52) U.S. Cl. .............. 455/562.1; 455/277.1; 455/101; 455/103; 455/140; 455/133; 370/437; 375/260; 375/299

(58) Field of Classification Search .......... 455/101, 455/562.1, 69, 277.1, 140, 272, 450, 66.1, 455/103, 500, 132, 133, 67.11, 126, 24, 21; 370/329, 338, 437, 310, 208; 375/260, 219, 375/295, 316, 296, 267, 144, 299, 146, 152
See application file for complete search history.

(56) References Cited

U.S. PATENT DOCUMENTS
2004/0072336 A1    4/2004 Parra et al.
(Continued)

FOREIGN PATENT DOCUMENTS
EP       1290508 B1        12/2001
KR    10-2004-0079448       9/2004

OTHER PUBLICATIONS

Andreas F. Molish, M.Z. Win and J.H. Winters "Capacity of MIMO Systems with Antenna Selection", Communications, IEEE Int'l Conf., vol. 2, pp. 570-574, Jun. 2001.

A. Gorohkov, M. Collados, D. Gore and A. Paulraj, "Transmit/Receive MIMO Antenna Subset Selection", Acoustics, Speech, and Signal Processing, Proceedings, ICASSP, IEEE Int'l Conf., vol, pp. ii-13-16, May 2004.

(Continued)

*Primary Examiner* — Sujatha Sharma
(74) *Attorney, Agent, or Firm* — Kile Park Goekjian Reed & McManus PLLC

(57) ABSTRACT

Provided is a low-complexity transmit/receive antenna selection method for Multi-Input Multi-Output (MIMO) systems. The method includes the steps of generating a gain matrix of receive channel, calculating norm values of channel gains for each row (receive antennas) and column (transmit antennas) of the generated gain matrix of the receive channel, selecting an antenna with the maximum norm value among the calculated norm values of channel gains, and repeatedly performing the process of alternately selecting transmit and receive antennas having the maximum channel gain value among the channel gain values of the selected antenna until a required number of antennas is all selected.

10 Claims, 7 Drawing Sheets

U.S. PATENT DOCUMENTS

| | | | | |
|---|---|---|---|---|
| 2005/0287962 | A1* | 12/2005 | Mehta et al. | 455/101 |
| 2008/0247488 | A1* | 10/2008 | Li et al. | 375/299 |
| 2008/0260002 | A1* | 10/2008 | Zhang et al. | 375/144 |
| 2009/0238298 | A1* | 9/2009 | Kim et al. | 375/267 |
| 2009/0290563 | A1* | 11/2009 | Gu et al. | 370/338 |
| 2010/0150265 | A1* | 6/2010 | Wu et al. | 375/296 |
| 2010/0248656 | A1* | 9/2010 | Zhou | 455/101 |
| 2010/0254339 | A1* | 10/2010 | Ihm et al. | 370/329 |

OTHER PUBLICATIONS

J.S.Park and D.J. Park, "A new antenna selection algorithm with low complexity for MIMO wireless systems", communications, ICC 2005, vol. 4, pp. 2308-2312, May 16-20, 2005.

A.F.Moish, "MIMO system within antenna selection—an overview", Radio and Wireless Conference 2003. RAWCON'3, Proceedings pp. 167-170, Aug. 10-13, 2003.

"Antenna Selection for Spatial Multiplexing Systems Based on Minimum Error Rate" (IEEE International conference on Communication, vol. 7 pp. 2276-2280, Jun. 2001).

"A Contruction of Space-Time Code Based on Number Theory" (IEEE Transaction on information Theory, vol. 48, No. 3, pp. 753-760, Mar. 2002).

"Low-Complexity Joint Transmit/Receive Antenna Selection Method for MIMO Systems" (2005 Proceeding of Summer Conference vol. 31, by D.S. Kwon, C. G. Kang, & J. H. Son).

International Search Report for corresponding International Application No. PCT/KR2005/004430 completed on Mar. 31, 2006.

* cited by examiner

FIG. 2

| | T1 | T2 | T3 | T4 | NORM (Proposed I) | SUM (Proposed II) |
|---|---|---|---|---|---|---|
| R1 | 7.4 | 4.9 | 9.3 | 4.8 | 187.4 | 26.3 |
| R2 | 0.5 | 9.8 | 1.8 | 4.5 | 120.1 | 16.6 |
| R3 | 9.4 | 2.8 | 1.3 | 2.9 | 105.7 | 16.4 |
| R4 | 4.1 | 0.4 | 8.0 | 9.5 | 171.3 | 22.0 |
| NORM (Proposed I) | 158.8 | 127.9 | 155.6 | 142.0 | | |
| SUM (Proposed II) | 21.3 | 17.9 | 20.4 | 21.7 | | |

FIG. 5

| Selection method | Big-O | Example of complexity | Example of normalized complexity |
|---|---|---|---|
| Full Exhaustive Search | $\binom{M_r}{L_r}\binom{M_R}{L_R} L_r^2 \times \max(L_r, L_R)$ | 313,600 | 9,800 |
| Partial Exhaustive Search | $O\left[\max\left\{\binom{M_r}{L_r}(L_T^3 + L_T^2 M_R), \binom{M_R}{L_R}(L_T^3 + L_T^2 L_R)\right\}\right]$ | 13,440 | 420 |
| proposed method I | $O(M_T M_R)$ | 64 | 2 |
| proposed method II | $O(M_T L_T)$ | 32 | 1 |

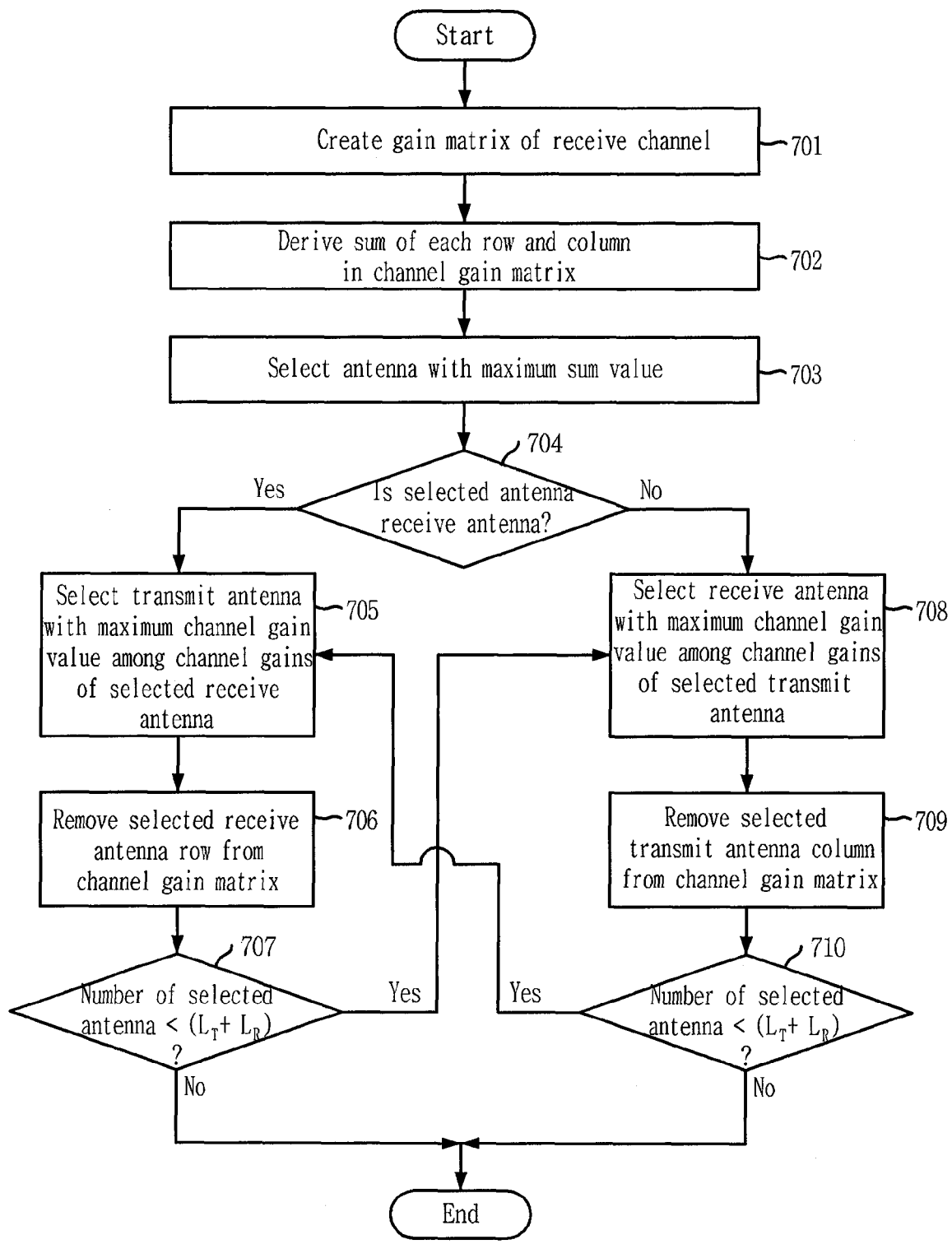

LOW-COMPLEXITY JOINT TRANSMIT/RECEIVE ANTENNA SELECTION METHOD FOR MIMO SYSTEMS

TECHNICAL FIELD

The present invention relates to a low-complexity transmit/receive antenna selection method for Multi-Input Multi-Output (MIMO) systems, and more particularly, to a low-complexity transmit/receive antenna selection method for MIMO systems, which is capable of saving cost and facilitating implementation by reduction of complexity by minimizing a procedure and an amount of calculation to obtain a subset including antenna selected in case of adopting an antenna selection method all at both a transmit antenna and a receive antenna of MIMO system.

BACKGROUND ART

Generally, MIMO systems employing multiple transmit/receive antennas, which are radio transmission systems that can maximize data transmission rate through spatial multiplexing together with diversity gain, are established as the core technology of the next generation mobile communications. But, this improvement of reliability and performance causes an increase of complexity of hardware and also an increase of cost due to use of a plurality of Radio Frequency (RF) chains.

On the other hand, when comparing a system that uses N RF chains and N antennas with a system that selects and uses N antennas among M (M≧N) while adopting the same N RF chains, the latter system using antenna selection leads to a very large improvement of performance although using the same number of RF chains. Therefore, there has been considered an antenna selection technique as a scheme that takes advantages of MIMO systems while lowering complexity of system hardware and decreasing cost owing to use of plural RF chains.

Meanwhile, as prior arts for adopting an antenna selection technique at both transmitting and receiving ends, there are "Full Exhaustive Search" (Andreas F. Molish, M. Z. Win and J. H. Winters), and "Capacity of MIMO Systems with Antenna Selection", Communications, IEEE Int'l Conf., vol. 2, pp. 570-574, June 2001, which calculate given capacitances of all possible subsets of antennas and then decide a subset with the maximum capacitance. Also, there are further proposed "Partial Exhaustive Search" (A. Gorohkov, M. Collados, D. Gore and A. Paulraj), and "Transmit/Receive MIMO Antenna Subset Selection", Acoustics, Speech, and Signal Processing, Proceedings, ICASSP, IEEE Int'l Conf., vol. 2, pp. ii-13-16, May 2004. These prior arts derive determinants of all cases with size of $M_R \times M_T$ through exhaustive search and select a subset with the maximum capacitance among them at a transmitting end, rather than finding a required subset at a time; and then find $L_R \times L_T$ from $M_R \times M_T$ through exhaustive search for a selected antenna at a receiving end.

However, since these conventional methods are all based on the exhaustive search, they have a very large unreal complexity. In other words, the full exhaustive search calculates determinants of all cases by searching by the number of cases of $$\binom{M_R}{L_R}\binom{M_T}{L_T},$$

thereby resulting in a very much amount of calculation and a very high degree of complexity. Meanwhile, the partial exhaustive search conducts searching by the number of cases of $$\binom{M_R}{L_R}+\binom{M_T}{L_T},$$

which brings about a large reduction of an amount of calculation. However, this search still requires calculation of a great number of determinants, thus leading to a very high degree of complexity.

DISCLOSURE

Technical Problem

It is, therefore, an object of the present invention to provide a low-complexity transmit/receive antenna selection method for MIMO system, which selects and utilizes a portion of multiple antennas at both transmit/receive ends of MIMO system, to thereby minimize deterioration of performance by making use of characteristic of MIMO system and considerably reducing the degree of complexity.

Technical Solution

In accordance with one aspect of the present invention, there is provided a low-complexity transmit/receive antenna selection method for MIMO systems, the method including the steps of: generating a gain matrix of receive channel; calculating norm values of channel gains for each row (receive antennas) and column (transmit antennas) of the generated gain matrix of the receive channel; selecting an antenna with the maximum norm value among the calculated norm values of channel gains; and repeatedly performing the process of alternately selecting transmit and receive antennas having the maximum channel gain value among the channel gain values of the selected antenna until a required number of antennas is all selected.

In accordance with another aspect of the present invention, there is provided a low-complexity transmit/receive antenna selection method for MIMO systems, the method including the steps of: generating a gain matrix of receive channel; calculating sums of channel gains for each row (receive antennas) and column (transmit antennas) of the generated gain matrix of the receive channel; selecting an antenna with the maximum sum among the calculated sums of channel gains; and repeatedly performing the process of alternately selecting transmit and receive antennas having the maximum channel gain value among the channel gain values of the selected antenna until a required number of antennas is all selected.

As mentioned above, the present invention alternately selects transmit antennas and receive antennas with the largest channel gain in $M_R \times M_T$ channel gain matrix to choose $L_R \times L_T$ channel matrix that maximizes Frobenius norm.

The other objectives and advantages of the invention will be understood by the following description and will also be appreciated by the embodiments of the invention more clearly. Further, the objectives and advantages of the invention will readily be seen that they can be realized by the means and its combination specified in the claims.

ADVANTAGEOUS EFFECTS

The present invention has an advantage in that it can minimize deterioration of performance by making use of characteristic of MIMO system and considerably reducing the degree of complexity by means of selecting and utilizing a portion of multiple antennas at both transmit/receive ends of MIMO system.

In other words, in case where antenna selection is made at both transmit/receive ends of multiple-antenna system, the present invention can easily implement such system with remarkable low degree of complexity through a very simple technique and also can save cost, unlike the existing exhaustive search techniques that need searching for all possible subsets and thus a lot of calculation.

DESCRIPTION OF DRAWINGS

The above and other objects and features of the present invention will become apparent from the following description of the preferred embodiments given in conjunction with the accompanying drawings, in which:

FIG. 2 shows a view for describing a transmit/receive antenna selection method that selects 2×2 antennas among 4×4 in accordance with an embodiment of the present invention;

FIG. 5 is a view showing a comparison of complexity of an amount of calculation of the present invention and the existing antenna selection methods;

FIG. 7 illustrates a flowchart for describing an operation of the sum-based transmit/receive antenna selection method in accordance with another embodiment of the present invention.

BEST MODE FOR THE INVENTION

The above-mentioned objectives, features, and advantages will be more apparent by the following detailed description in association with the accompanying drawings; and thus, the invention will be readily conceived by those skilled in the art to which the invention pertains. Further, in the following description, well-known arts will not be described in detail if it seems that they could obscure the invention in unnecessary detail. Hereinafter, preferred embodiments of the present invention will be set forth in detail with reference to the accompanying drawings.

Figure 1:
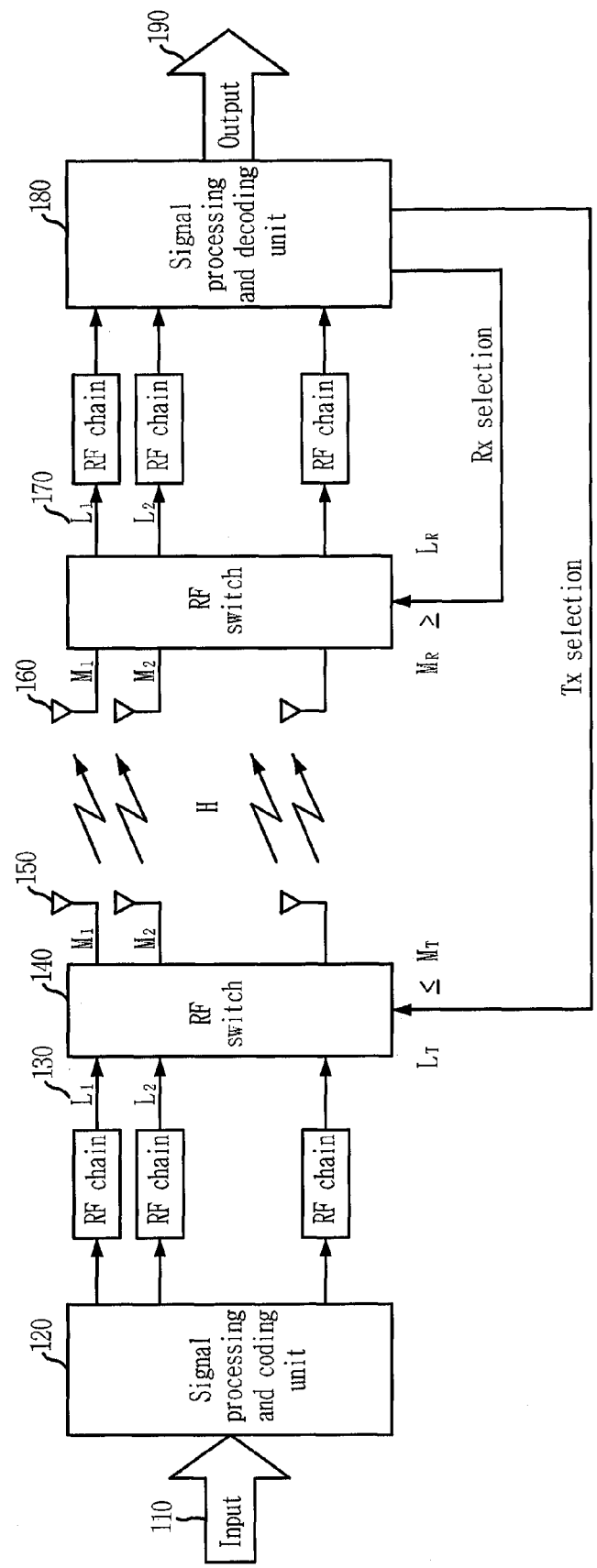
FIG. 1 illustrates a block diagram for describing a transmit/receive antenna selection method for multiple antenna system to which the present invention is applied.

FIG. 1 illustrates a block diagram for describing a transmit/receive antenna selection method for multiple antenna system to which the present invention is applied.

First of all, a basic system model will be introduced referring to FIG. 1. Input signals 110 are first sent through $M_T$ ($M_T \geq L_T$) number of transmit antennas 150 as $L_T$ number of parallel signals via $L_T$ number of RF chains 130. These signals are received through $M_R$ ($M_R \geq L_R$) number of receive antennas 160 and then provided as output information via $L_T$ number of RF chains 170.

In other words, the input signals 110 from outside are sent through $L_T$ number of transmit antennas 130 selected among $M_T$ ($M_T \geq L_T$) number of transmit antennas 150 via a signal processing and coding unit 120; and those signals are received through $L_R$ number of receive antennas 170 selected out of $M_R$ number of receive antennas 160.

In such a case, an important issue is to find subsets of $L_R \times L_T$ with the maximum norm value with respect to $M_R \times M_T$ channel gain matrix, which is sent through $M_T$ number of transmit antennas 150 and received through $M_R$ number of receive antennas 160. The present invention can find the subsets in a simpler and faster calculation manner by applying a new scheme, rather than the scheme that is based on the existing exhaustive searches.

On the other hand, the transmit/receive antenna selection method is represented by Eq. (1) below in case of using orthogonal block temporal/spatial codes in a space diversity system model and by Eq. (2) below in case of using spatial multiplexing system model.

$$h_{eq} = \sqrt{\frac{1}{L_T} \sum_{i=1}^{L_R} \sum_{j=1}^{L_T} |\tilde{H}_{ij}|^2} \qquad \text{Eq. (1)}$$

$$C = \log_2 \det\left(I_{L_T} + \frac{\rho}{L_T} \tilde{H}^\dagger \tilde{H}\right) \qquad \text{Eq. (2)}$$

wherein in Eq. (1) above, $\tilde{H}_{ij}$ indicates an element of channel gain matrix $\tilde{H}$ of selected antenna; and in Eq. (2) above, $\rho$ denotes received Signal to Noise Ratio (SNR), $\tilde{H}$ is a channel matrix of selected antenna of $L_R \times L_T$, $I_{L_T}$ is an identity matrix of a size of $L_T \times L_T$, and $\tilde{H}^\dagger$ is Hermitian matrix of $\tilde{H}$.

Meanwhile, in case of spatial multiplexing model, the above equation is approximated at low SNR by asymptotical way through Tayor extension as:

$$C_{HS/MIMO} \approx \frac{\gamma}{M_T \ln(2)} \sum_{i=1}^{L_R} \sum_{j=1}^{L_T} |\tilde{H}_{ij}|^2 \qquad \text{Eq. (3)}$$

Therefore, in case of both the space diversity and spatial multiplexing, it is possible to represent as equations proportional to $|\tilde{H}_{ij}|^2$ all.

The present invention provides a technique that sequentially selects transmit antennas and receive antennas in the order of value of channel matrix element in channel gain matrix while alternating those transmit antennas and receive antennas, and then finds a subset $\tilde{H}$ of H that meets max $\tilde{H}$. At this time, it is assumed that the number of antennas selected at the transmitting and receiving ends is equal where $L_T = L_R$.

The present invention presents two embodiments that consider a case of selecting a subset with the maximum Frobenius norm of channel matrix of selected antennas, wherein a concrete example is described with reference to FIG. 2.

FIG. 2 shows a view for describing a transmit/receive antenna selection method that selects 2×2 antennas among 4×4 in accordance with an embodiment of the present invention. That is, FIG. 2 represents channel states by antennas of an MIMO system having 4 transmit antennas and 4 receive antennas, and also shows an example of finding 2 transmit antennas and 2 receive antennas.

Firstly, a norm-based transmit/receive antenna selection method (proposed method I) will be explained.

First step: a magnitude of each element of gain matrix H of receive channel is derived by absolutizing it, and then a sum of squares of element magnitude for each row (receive antennas) and column (transmit antennas) is obtained.

Second step: one column or row 200 with the maximum sum is selected for each column and row among the sums of magnitudes derived in the first step, and a corresponding antenna 210 is selected.

Third step: if the row is selected in the second step, an element $|h_{max}|$ 220 with the maximum magnitude is selected in the selected row and a column 230 having $|h_{max}|$ is selected (if the column is selected, column and row are opposite).

Fourth step: an element 240 with the maximum value is selected, excluding the element $|_{max}|$ 220 from the column 230 selected in the third step; and a row 250 including that element is selected.

Fifth step: the third and fourth steps are repeated until the required numbers $L_T$ and $L_R$ of antennas are selected.

Secondly, a sum-based transmit/receive antenna selection method (proposed method II) will be described below.

First step: a magnitude of each element of gain matrix H of receive channel is derived by absolutizing it, and then a sum of magnitudes of each element for each row (receive antennas) and column (transmit antennas) is obtained.

Second to fifth steps: the second to fifth steps are repeated in the same manner as the norm-based transmit/receive antenna selection method.

According to the present invention as described above, the subset of most good antennas can be easily and rapidly found with extremely small amount of calculation through very simple method, unlike the existing exhaustive search method that searches a great number of subsets troublesomely to find such good subset. Due to this, it is possible to facilitate implementation of the transmit/receive antenna selection method and for the implemented system to enable a faster calculation.

Figure 3:
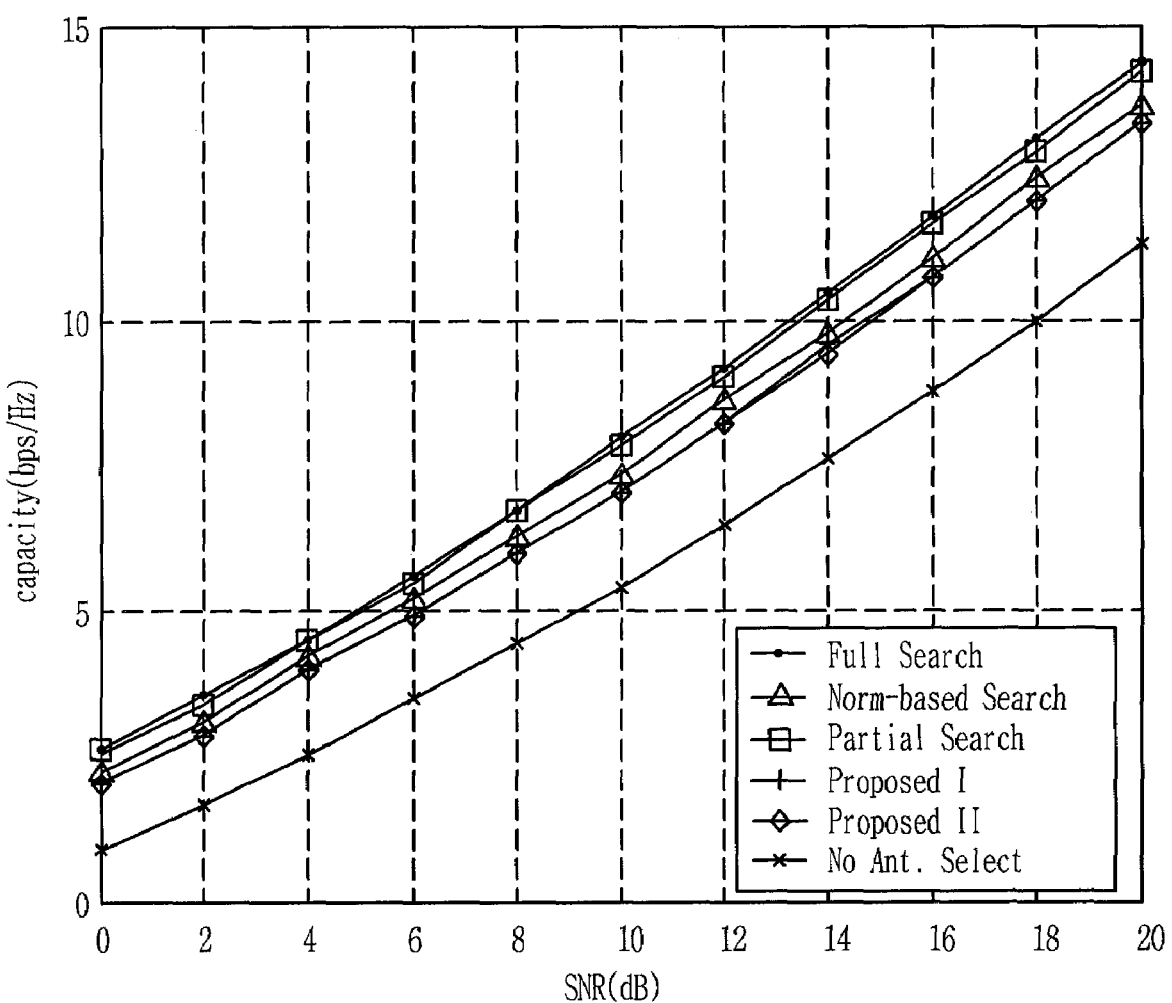
FIG. 3 is a view showing a performance with respect to SNR where 2×2 antennas are selected from 4×4 in accordance with an embodiment of the present invention.

FIG. 3 is a view showing a performance with respect to Signal to Noise Ratio (SNR) where 2×2 antennas are selected from 4×4 in accordance with an embodiment of the present invention. That is, FIG. 3 is a view depicting simulation results of the existing methods such as "full exhaustive search", "partial exhaustive search", and "norm-based search" that derives norms of all subsets with exhaustive search, the two methods (the norm-based and sum-based methods) of the present invention, and a case with no antenna selection.

Referring to FIG. 3, it appears to be a similar performance with little difference between the two methods (the norm-based and sum-based methods) of the present invention and the norm-based method of the prior art. But, the two methods of the present invention have a performance difference of 1 dB or less at low SNR, compared with the full exhaustive search and partial exhaustive search.

Figure 4:
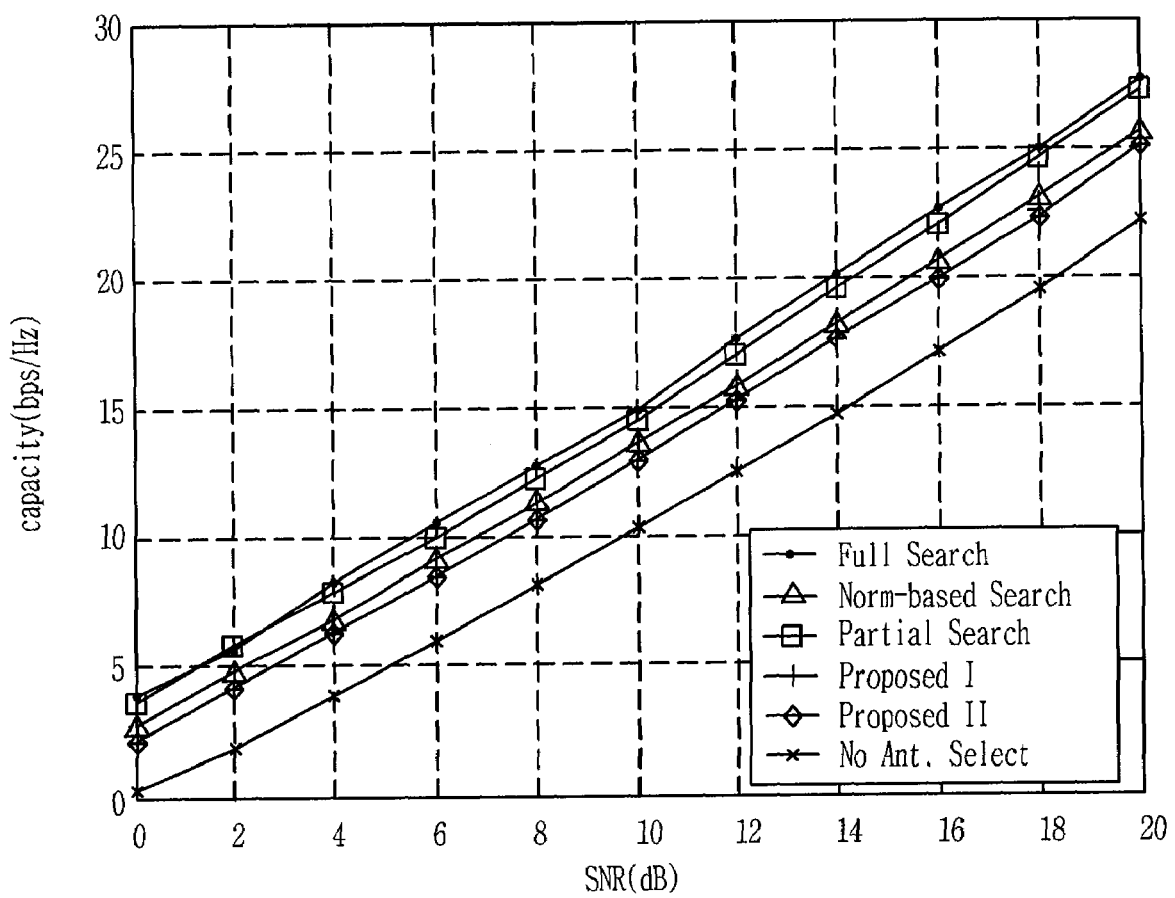
FIG. 4 is a view showing a performance with respect to SNR where 4×4 antennas is selected from 8×8 in accordance with an embodiment of the present invention.

FIG. 4 is a view showing a performance with respect to SNR where 4×4 antennas is selected from 8×8 in accordance with an embodiment of the present invention.

Referring to FIG. 4, it seems that the two methods (norm-based and sum-based methods) of the present invention have a performance deterioration of about 0.5 to 2 dB, compared with the full exhaustive search. But, there is a trade-off between this performance degradation and an amount of calculation, wherein a remarkable reduction of the calculation amount is existed, as shown in FIG. 5.

FIG. 5 is a view showing a comparison of complexity of an amount of calculation of the present invention and the existing antenna selection methods.

That is, FIG. 5 describes a comparison of complexity 550 of the full exhaustive search 510, partial exhaustive search 520, the proposed method I 530 of the present invention which is based on the norm, and the proposed method II 540 of the present invention which is based on the sum. Further, it illustrates the complexity 560 where the 4×4 antennas are selected from 8×8 for each method.

Meanwhile, an example 570 of normalized complexity shows an example that compares with complexities of other methods under the state that the proposed method II 540 of the present invention that is based on the sum with the lowest complexity is normalized and set to "1", as given by reference numeral 590. According to this, the proposed method II 540 of the invention has a reduction in an amount of calculation of about $1/10,000$, compared with an amount of calculation 580 of the full exhaustive search 510; and has a considerable reduction in an amount of calculation of about $1/400$, compared with the partial exhaustive search 520.

As shown in FIGS. 3 and 4 above, the two methods proposed by the present invention have almost identical performance result. But, the amount of calculation of the norm-based method of the present invention is nearly twice that of the sum-based method of the present invention; and thus, it can be seen that the sum-based method is more excellent than the norm-based method.

Figure 6:
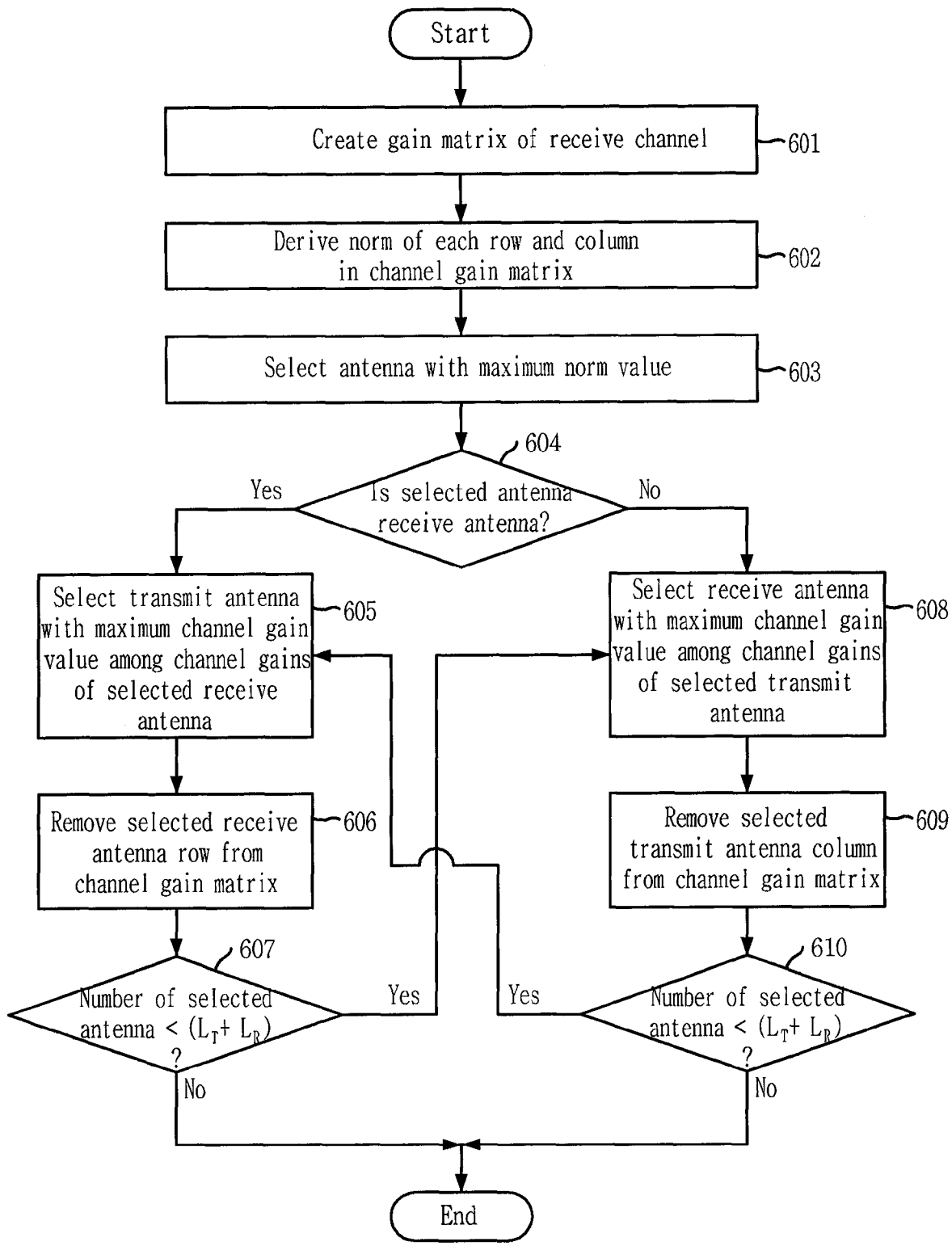
FIG. 6 exemplifies a flowchart for describing an operation of the norm-based transmit/receive antenna selection method in accordance with an embodiment of the present invention.

FIG. 6 exemplifies a flowchart for describing an operation of the norm-based transmit/receive antenna selection method in accordance with an embodiment of the present invention.

First, a gain matrix H of receive channel is created at step 601. Next, at step 602, norms for each row and column are derived from the created gain matrix H of the receive channel. That is, a magnitude of each element of the created gain matrix H of the receive channel is calculated by absolutizing each element, and a sum of squares of magnitude of each element is calculated for each row (receive antennas) and column (transmit antennas).

At a following step 603, an antenna with the maximum norm value is selected based on the derived norm values. In other words, among the sums of squares of magnitude of each element calculated in the step 602 for each row and column, one row or column with the maximum sum is selected and a corresponding antenna is selected.

As mentioned above, the present invention selects the maximum sum of squares of each channel gain for each row and column among the transmit/receive antennas to be selected in the channel gain matrix of the whole transmit/receive antennas, and then selects a first antenna. This may be represented by:

$$\hat{p}_{Ri} = \sum_{n=1}^{M_T} |H_{in}|^2, \quad i = 1, 2, \ldots, M_R$$

$$\hat{p}_{Tk} = \sum_{m=1}^{M_R} |H_{mk}|^2, \quad k = 1, 2, \ldots, M_T$$

$$s_1 = \arg\max_{\forall i,k}\{\hat{p}_{Ri}, \hat{p}_{Tk}\}$$

Eq. (4)

Thereafter, at steps 604 and 610, the process of the present invention repeatedly performs the process of alternately selecting transmit/receive antennas having the maximum channel gain value among the channel gain values of the selected antennas until a required number of antennas is all selected. That is, the process alternately selects a transmit antenna or a receive antenna with the maximum value among the channel gains of the firstly selected antenna, removes previously selected antenna from the channel gain matrix if the transmit/receive antenna is newly selected as such, and then repeatedly conducts the process of selecting a next antenna until the required number of antennas is selected. Details of this procedure will be provided below with reference to FIG. 6.

First, the process of the invention confirms at step 604 whether the firstly selected antenna is a receive antenna or a transmit antenna.

If it is confirmed at step 604 that the firstly selected antenna is the receive antenna, the process selects the transmit antenna with the maximum value among the channel gains of the selected receive antenna at step 605 and then removes the previously selected receive antenna from the channel gain matrix at step 606. Next, the process confirms at step 607 whether the required number of antennas is selected and ends the operation if so; and goes to a following step 608 if not.

Meanwhile, if it is confirmed at step 604 that the firstly selected antenna is the transmit antenna, the process selects the receive antenna with the maximum value among the channel gains of the selected transmit antenna at step 608 and then removes the previously selected transmit antenna from the channel gain matrix at step 609. Subsequently, the process confirms at step 610 whether the required number of antennas is selected and halts the operation if so; and returns to step 605 if not.

FIG. 7 shows a flowchart for describing an operation of the sum-based transmit/receive antenna selection method in accordance with another embodiment of the present invention.

First, a gain matrix H of receive channel is created at step 701. Next, at step 702, sums for each row and column are derived from the created gain matrix H of the receive channel. That is, a magnitude of each element of the created gain matrix H of the receive channel is calculated by absolutizing each element, and a sum of magnitudes of each element is calculated for each row (receive antennas) and column (transmit antennas).

At a following step 703, an antenna with the maximum sum value is selected based on the derived sum values. In other words, among the sums of magnitudes of each element calculated in the step 702 for each row and column, one row or column with the maximum sum is selected and a corresponding antenna is selected.

As mentioned above, the present invention selects the maximum sum of each channel gain for each row and column among the transmit/receive antennas to be selected in the channel gain matrix of the whole transmit/receive antennas, and then selects a first antenna. This may be given by:

$$\hat{p}_{Ri} = \sum_{n=1}^{M_T} |H_{ni}|, \quad (i = 1, 2, \ldots, M_R)$$

$$\hat{p}_{Tk} = \sum_{m=1}^{M_R} |H_{mk}|, \quad (k = 1, 2, \ldots, M_T)$$

$$s_1 = \arg\max_{\forall i,k} \{\hat{p}_{Ri}, \hat{p}_{Tk}\}$$

Eq. (5)

Thereafter, at steps 704 and 710, the process of the present invention repeatedly performs the process of alternately selecting transmit/receive antennas having the maximum channel gain values among the channel gain values of the selected antenna until a required number of antennas is all selected. That is, the process alternately selects a transmit antenna or a receive antenna with the maximum value among the channel gains of the firstly selected antenna, removes previously selected antenna from the channel gain matrix if the transmit/receive antenna is newly selected as such, and then repeatedly carries out the process of selecting a next antenna until the required number of antennas is selected. A detailed description of this procedure will be provided below with reference to FIG. 7.

First, the process of the invention confirms at step 704 whether the firstly selected antenna is a receive antenna or a transmit antenna.

If it is confirmed at step 704 that the firstly selected antenna is the receive antenna, the process selects the transmit antenna with the maximum value among the channel gains of the selected receive antenna at step 705 and then removes the previously selected receive antenna from the channel gain matrix at step 706. Next, the process confirms at step 707 whether the required number of antennas is selected and ends the operation if so; and proceeds to a following step 708 if not.

Meanwhile, if it is confirmed at step 704 that the firstly selected antenna is the transmit antenna, the process selects the receive antenna with the maximum value among the channel gains of the selected transmit antenna at step 708 and then removes the previously selected transmit antenna from the channel gain matrix at step 709. Subsequently, the process confirms at step 710 whether the required number of antennas is selected and halts the operation if so; and returns to step 705 if not.

The method of the present invention as mentioned above may be implemented by a software program and stored in a computer-readable storage medium such as CD-ROM, RAM, ROM, floppy disk, hard disk, optical magnetic disk, etc. This process may be readily carried out by those skilled in the art; and therefore, details of thereof are omitted here.

While the present invention has been described with respect to certain preferred embodiments, it will be apparent to those skilled in the art that various changes and modifications may be made without departing from the scope of the invention as defined in the following claims.

What is claimed is:

1. A low-complexity transmit/receive antenna selection method for Multi-Input Multi-Output (MIMO) systems, the method comprising the steps of:
    generating a gain matrix of receive channel;
    calculating norm values of channel gains for each row (receive antennas) and column (transmit antennas) of the generated gain matrix of the receive channel;
    selecting an antenna with the maximum norm value among the calculated norm values of channel gains; and
    repeatedly performing the process of alternately selecting transmit and receive antennas having the maximum channel gain value among the channel gain values of the selected antenna until a required number of antennas is all selected.

2. The method as recited in claim 1, wherein the norm value calculating step calculates a magnitude of each element of the generated gain matrix of receive channel by absolutizing each element, and calculates a sum of squares of magnitude of each element for each row (receive antennas) and column (transmit antennas).

3. The method as recited in claim 2, wherein the antenna selecting step selects one row or column with the maximum sum among the sums of squares of the element magnitude for each row and column of the gain matrix of the receive channel, and selects an antenna corresponding to the selected row or column.

4. The method as recited in claim 1, wherein the repeatedly performing step alternately selects transmit antenna and receive antennas with the maximum value among the channel gain values of the antenna selected in said antenna selecting step; and then removes previously selected antenna from the channel gain matrix if the new transmit/receive antenna is selected and repeatedly performs the process of selecting a next antenna until the required number of antennas is selected.

5. The method as recited in claim 1, wherein the repeatedly performing step includes the steps of:
confirming whether the antenna selected in said antenna selecting step is a receive antenna or a transmit antenna;
if the antenna selected in said antenna selecting step is the receive antenna, selecting a transmit antenna with the maximum value among the channel gains of the selected receive antenna and removing the previously selected receive antenna from the channel gain matrix; and confirming whether the required number of antennas is selected, and ending the operation if so and going to the step of selecting a receive antenna if not; and
if the antenna selected in said antenna selecting step is the transmit antenna, selecting a receive antenna with the maximum value among the channel gains of the selected transmit antenna and removing the previously selected transmit antenna from the channel gain matrix; and confirming whether the required number of antennas is selected, and ending the operation if so and going to said step of selecting the transmit antenna if not.

6. A low-complexity transmit/receive antenna selection method for MIMO systems, the method comprising the steps of:
generating a gain matrix of receive channel;
calculating sums of channel gains for each row (receive antennas) and column (transmit antennas) of the generated gain matrix of the receive channel;
selecting an antenna with the maximum sum among the calculated sums of channel gains; and
repeatedly performing the process of alternately selecting transmit and receive antennas having the maximum channel gain value among the channel gain values of the selected antenna until a required number of antennas is all selected.

7. The method as recited in claim 6, wherein the sum calculating step calculates a magnitude of each element of the generated gain matrix of receive channel by absolutizing said each element, and calculates a sum of magnitudes of each element for each row (receive antennas) and column (transmit antennas).

8. The method as recited in claim 7, wherein the antenna selecting step selects one row or column with the maximum sum among the sums of element magnitudes for each row and column of the gain matrix of the receive channel, and selects an antenna corresponding to the selected row or column.

9. The method as recited in claim 6, wherein the repeatedly performing step alternately selects transmit antenna and receive antennas with the maximum value among the channel gain values of the antenna selected in said antenna selecting step; and then removes previously selected antenna from the channel gain matrix if the new transmit/receive antenna is selected and repeatedly performs the process of selecting a next antenna until the required number of antennas is selected.

10. The method as recited in claim 6, wherein the repeatedly performing step includes the steps of:
confirming whether the antenna selected in said antenna selecting step is a receive antenna or a transmit antenna;
if the antenna selected in said antenna selecting step is the receive antenna, selecting a transmit antenna with the maximum value among the channel gains of the selected receive antenna and removing the previously selected receive antenna from the channel gain matrix; and confirming whether the required number of antennas is selected, and ending the operation if so and going to the step of selecting a receive antenna if not; and
if the antenna selected in said antenna selecting step is the transmit antenna, selecting a receive antenna with the maximum value among the channel gains of the selected transmit antenna and removing the previously selected transmit antenna from the channel gain matrix; and confirming whether the required number of antennas is selected, and ending the operation if so and going to said step of selecting the transmit antenna if not.

* * * * *